Patented May 3, 1938

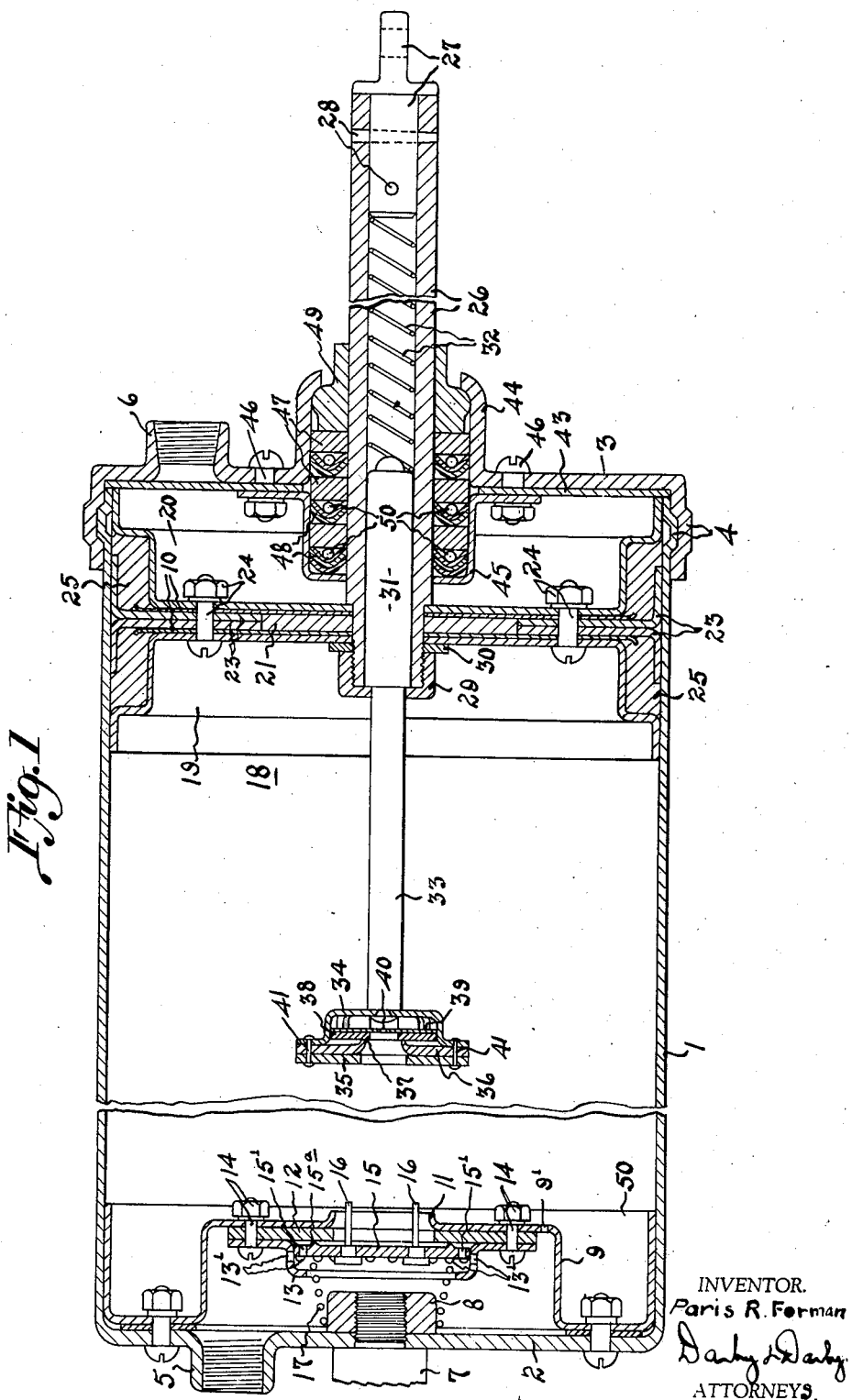

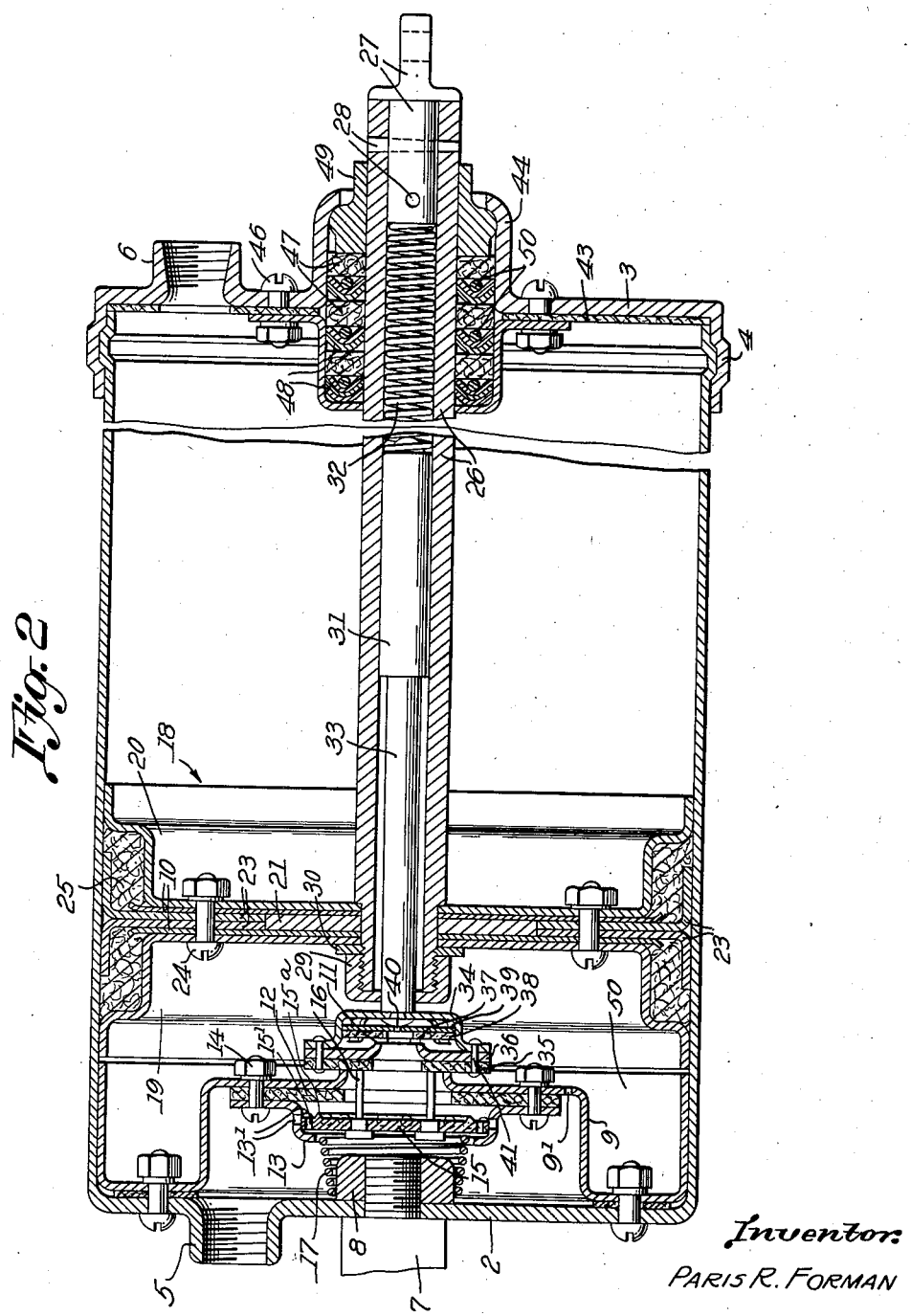

2,115,845

UNITED STATES PATENT OFFICE 2,115,845

PRESSURE FLUID ENGINE

Paris R. Forman, Rahway, N. J., assignor to National Pneumatic Company, New York, N. Y., a corporation of West Virginia Application August 20, 1936, Serial No. 97,004

1 Claim. (Cl. 121—44)

This invention relates to improvements in fluid pressure engines, particularly of the type known as vacuum engines.

The objects of this invention are to provide an inexpensive, simplified engine structure particularly adapted to work in vacuum systems for operating doors, similar movable closures, and in fact any mechanism adaptable for use therewith.

The various objects and advantages of the invention will become apparent from the following detailed description.

This invention resides substantially in the combination, construction, arrangement, and relative location of parts, all in accordance with the specification and drawings attached.

In the accompanying drawings,

Figure 1 is a longitudinal, vertical, cross-sectional view through a structure in accordance with this invention, with some parts broken away, showing the piston at one end of the cylinder;

Figure 2 is a similar view showing the piston at the other end of the cylinder.

The engine comprises a cylinder 1 and an integral head 2. The open end of the cylinder is closed by means of a removable head 3 which is locked in place by means of bayonet joints or their equivalent and sealed to the end of the cylinder by means of any suitable form of gasket, as illustrated at 43. The integral head 2 is provided with an internally threaded sleeve 5 to receive a pipe connection while the removable head 3 is provided with a similar internally threaded sleeve 6. At 7 is generally indicated a bracket or arm secured to the integral head by means of a nut 8 so that the cylinder may be pivotally mounted on a suitable support.

Secured within the cylinder by means of bolts is a cup member 50, preferably of metal, having a reentrant, central, enlarged boss 9 in the bottom wall thereof. The boss 9 is closed by the head 2 when the cup 50 is secured in place as shown to form a small chamber which is open to the sleeve 5. The bottom of the boss is provided with a central opening encircled by a flange which forms an annular seat 11. At 12 is a disc with a central aperture aligned with the opening in the boss 9 and made of any suitable seating material, such as leather. This disc is clamped between the end wall of the boss 9 and a cup-shaped member 13 which has an enlarged central opening in the bottom wall thereof. These parts are secured together by means of the nuts and bolts 14 to form a fluid-tight joint at the areas of contact.

The annular side wall of the cup member 13 is provided with a series of ports 13'. Mounted within the cup 13 is a valve disc 15 positioned so that it may seat upon the disc 12. The valve disc 15 is provided with four pins 16 securely mounted thereon and arranged with equal spacing on the circumference of a circle so as to project through the opening in the disc 12 and the opening in the wall of the boss 9. The disc 15 has a series of openings 15' therethrough in the region outside of the seating ring 15$^a$ formed thereon. This seating ring cooperates with the disc 12 to form a fluid-tight seal. A spring 17 lies between the head 2 and the disc 15 to normally seat it on the disc 12. The boss 9 is provided with a small port 9' of any suitable size, such as that formed by a No. 60 drill, for example.

At 18 is generally indicated the piston assembly of the engine. This assembly comprises a pair of annular cupped discs 19 and 20, which have clamped between them the spacer disc 21, the rings 23 which are flanged at the periphery, and the discs 10. All of these parts are secured together by means of the nuts and bolts 24. The flanges of the rings 23 serve to lock the piston packing 25 in the annular peripheral channel formed by the members 19 and 20. The packing 25 may be of any suitable material, such as oil soaked felt.

The piston rod 26 is of tubular form and is closed at the outer end by means of a plug 27 suitably shaped and formed to facilitate its attachment to the mechanism to be operated by the engine. This plug is secured in the end of the tubular piston rod by means of the taper pins 28.

The piston assembly 18 is mounted on the inner reduced end of the piston rod by means of a cap nut 29 which binds against a washer 30. Slidably mounted within the hollow piston rod is a plunger 31 which has a portion of the reduced diameter 33 projecting through a central opening in the cap nut 29 into the cylinder.

A valve mechanism is rigidly secured to the end of the projecting part 33 of the plunger and comprises a spider or cage 34 which has clamped thereon by means of the rivets 41 the centrally apertured discs 35 and 36. The disc 35 forms a valve disc for cooperation with the seat 11 on the boss 9 and is of some suitable material, such as leather. The aperture in the disc 36 is flanged at the periphery to form a seat 37 for cooperation with a centrally apertured disc 38 which is movably mounted in the cage 34. The disc 38 is a valve disc and is made of some suitable material, such as leather, which has permanently secured thereto a thin metal disc 39 which has a very small central aperture 40, such as would be produced, for example, by a No. 55 drill. A compression spring 32 is mounted between the plunger 31 and the plug 27 so as to normally hold the plunger and the parts mounted thereon in the position shown in the drawings.

The piston rod stuffing box comprises a casing formed by a central annular cuff 44 formed on the head 3 and a cup-shaped metal member 45 secured to the head by means of the nuts and bolts 46. The free end of the cuff is flanged inwardly to engage a suitably formed collar 49 which clamps between it and the bottom wall of the cup member 45 a series of fibrous discs 47 which may be oil saturated felt, for example.

Interposed between the discs 47 are a series of compression members 48 comprising, for example, thin annular rings of metal which are transversely curved in cross section and have mounted between them and the discs the wire rings 50. The oil felt packing 25 and the oil felt rings 47 serve to lubricate the cylinder and piston rod, respectively.

In the use of this mechanism, for operating the doors of vehicles for example, it is preferable to mount the cylinder on a pivotal support by means of the lug or arm 7. The piston rod is connected at the plug 27 either directly to the door or to intermediate linkage. It will be assumed, although it is not necessarily so, that in door closed position the parts of the engine are in the position shown with the pipe connected to the sleeve 6 connected to a vacuum source. To open the door a suitable four-way valve is re-positioned so as to open the pipe connected to the sleeve 6 to the atmosphere and the pipe connected to the sleeve 5 to the vacuum source. As a result, the valve disc 15 is pulled over against the bottom of the cup 13 compressing spring 17. The air in the left hand end of the cylinder is withdrawn, while air at atmospheric pressure is free to enter the right hand end of the cylinder. The result is that the piston assembly 18 and the piston rod with all parts mounted thereon, including plunger 31 and its parts, move to the left at a relatively fast speed. The air is exhausted from the left hand end of the cylinder through the aperture in the bottom of the boss 9, opening in disc 12, and the ports 13' in the cup 13. As soon as the disc 35 seats on the annular rim or seat 11, the free exhaustion of air from the cylinder is interrupted. Air may then only escape from the left hand end of the cylinder from the port 40, and through the port 9' simultaneously. For this reason the piston assembly completes its stroke at a much reduced speed.

During the period of slow movement of the piston assembly there is relative movement between the piston rod and the plunger 31, causing the compression of spring 32. Thus the door or other object being moved completes its movement at a slow speed.

In order to return the door to closed position the valve is repositioned and the pipe connected to sleeve 5 is open to the atmosphere and the pipe connected to sleeve 6 is connected to the vacuum source. Air is then exhausted from the right hand end of the cylinder and air at atmospheric pressure is introduced into the left hand end of the cylinder. The air at first enters the left hand end of the cylinder quite rapidly so that the piston returns at a relatively high speed.

This result is secured because air at atmospheric pressure passing through the ports 13' pushes the valve disc 38 off its seat so that air may move rapidly through the opening in the discs 35 and 36 and into the cylinder through the cage or spider 34. Disc 35 remains on its seat 11 during this portion of the stroke because, although the piston rod is moving, compressed spring 32 holds it there. However, as soon as the plunger 31 completes its sliding movement with respect to the piston rod 26, the disc 35 will move off the annular seat 11.

It is to be noted that while the annular disc 35 is on the seat 11 it engages the pins 16 to prevent valve disc 15 from being seated on the disc 12. However, as soon as disc 35 moves away from its seat 11 aided by spring 17, disc 15 is blown so that its seat 15ª engages the disc 12 and forms a seal with it. Air may now enter the left hand end of the cylinder only through the port 9'. Thus, the piston, and all parts mounted thereon, completes its stroke at a reduced speed. In the case of door operation the right hand end of the cylinder remains connected to the vacuum source at all times when the door is closed.

It is of course apparent that the engine may be inter-connected with the device to be operated so that, say in the case of a door, the door would be held closed when the piston is at the other end of the cylinder, in which case the left hand end would be connected to the vacuum source at that time.

From the above description it will be apparent that this invention resides in certain features of construction which may be embodied in other physical forms. I do not, therefore, desire to be strictly limited to the disclosure as given for purposes of illustration, but rather to the scope of the appended claim.

What I seek to secure by United States Letters Patent is:

In a vacuum engine of the type described the combination comprising a cylinder closed at both ends, a piston slidably mounted in the cylinder, a piston rod connected to the piston and projecting through one end of the cylinder, said cylinder having means for connecting either end thereof to a vacuum source, means at the other end of the cylinder forming a chamber isolated therefrom and having a large port and a restricted port opening into the cylinder, a valve member movable to open or close the larger port, and a valve slidably mounted on the piston comprising a ported seating member and a valve disc having a restricted port in alignment with the port of the ported member, said chamber means having a seat about the large port thereof for engagement by said ported member and said first valve being engaged by said ported member to unseat it whereby the speed of movement of the piston in either direction is reduced near the end of the stroke thereof.

PARIS R. FORMAN.